(12) United States Patent
Parsell et al.

(10) Patent No.: US 8,069,433 B2
(45) Date of Patent: Nov. 29, 2011

(54) MULTI-FORMAT CENTRALIZED DISTRIBUTION OF LOCALIZED RESOURCES FOR MULTIPLE PRODUCTS

(75) Inventors: Ryan D. Parsell, Puyallup, WA (US); Hesham Anan, Redmond, WA (US); Timothy J. McCracken, Woodinville, WA (US); Amol Kelkar, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1259 days.

(21) Appl. No.: 11/787,942

(22) Filed: Apr. 18, 2007

(65) Prior Publication Data
US 2008/0263052 A1 Oct. 23, 2008

(51) Int. Cl.
*G06F 9/44* (2006.01)
(52) U.S. Cl. ........ 717/103; 717/102; 717/171; 717/172; 709/201; 709/226
(58) Field of Classification Search .......... None
See application file for complete search history.

(56) References Cited

U.S. PATENT DOCUMENTS

| | | | | |
|---|---|---|---|---|
| 5,961,612 A * | 10/1999 | Satoh et al. | ...... | 710/10 |
| 6,292,830 B1 * | 9/2001 | Taylor et al. | ...... | 709/224 |
| 6,314,555 B1 * | 11/2001 | Ndumu et al. | ...... | 717/101 |
| 6,606,744 B1 * | 8/2003 | Mikurak | ...... | 717/174 |
| 6,623,529 B1 | 9/2003 | Lakritz | | |
| 6,842,899 B2 * | 1/2005 | Moody et al. | ...... | 718/100 |
| 6,865,716 B1 | 3/2005 | Thurston | | |
| 7,139,999 B2 * | 11/2006 | Bowman-Amuah | ...... | 717/101 |
| 7,406,677 B2 * | 7/2008 | Colling | ...... | 717/106 |
| 7,555,543 B2 * | 6/2009 | Encarnacion et al. | ...... | 709/223 |
| 7,650,608 B2 * | 1/2010 | Patel et al. | ...... | 719/328 |
| 7,660,887 B2 * | 2/2010 | Reedy et al. | ...... | 709/224 |
| 2001/0042123 A1 * | 11/2001 | Moody et al. | ...... | 709/226 |
| 2002/0046273 A1 * | 4/2002 | Lahr et al. | ...... | 709/224 |
| 2002/0116172 A1 | 8/2002 | Vargas | | |
| 2002/0147810 A1 * | 10/2002 | Traversat et al. | ...... | 709/224 |
| 2003/0058277 A1 * | 3/2003 | Bowman-Amuah | ...... | 345/765 |
| 2004/0031030 A1 * | 2/2004 | Kidder et al. | ...... | 717/172 |
| 2004/0107250 A1 * | 6/2004 | Marciano | ...... | 709/204 |

(Continued)

FOREIGN PATENT DOCUMENTS

WO WO2006032846 A2 3/2006

OTHER PUBLICATIONS

Title: QoS tuning and resource sharing for UMTS WCDMA multiservice mobile, author: Baey, S, dated: Dec. 16, 2002, source: IEEE.*

(Continued)

*Primary Examiner* — Chameli Das

(57) ABSTRACT

A multi-format centralized framework for the distribution of resources. The framework allows product teams to update resources independent of a product build process and, to store and distribute the resources from a central repository (a shared resource server system) in multiple formats. The central repository includes a storage structure that can support all markets and all products. Resources can now be updated on the product frontend or delivered directly to the client when requested. Team resources can be stored in a single file format (e.g., RESX) and distributed in multiple formats (e.g., XML, RESX, JS, etc.). Both server-side and client-side rendering are supported. In further support of the deployment of updated localized strings without requiring a build, the architecture supports the sub-versioning of strings. In support of scalability, different levels of caching of the strings through edge cache and custom designed cache mechanism are provided.

19 Claims, 14 Drawing Sheets

U.S. PATENT DOCUMENTS

| | | |
|---|---|---|
| 2004/0261054 A1 | 12/2004 | Colling |
| 2004/0267762 A1 | 12/2004 | Tunning et al. |
| 2005/0138193 A1* | 6/2005 | Encarnacion et al. ........ 709/230 |
| 2006/0026588 A1* | 2/2006 | Illowsky et al. .............. 717/171 |
| 2006/0048094 A1* | 3/2006 | Kipman et al. ............... 717/104 |
| 2006/0100973 A1 | 5/2006 | McMaster et al. |
| 2006/0130026 A1 | 6/2006 | McHugh et al. |
| 2006/0206871 A1 | 9/2006 | Kohlmeier et al. |
| 2006/0212575 A1 | 9/2006 | Lin et al. |
| 2007/0283282 A1* | 12/2007 | Bonfiglio et al. ............. 715/762 |
| 2008/0186931 A1* | 8/2008 | Prakash et al. ................ 370/338 |

OTHER PUBLICATIONS

"RC Localize 3.11", http://www.allworldsoft.com/software/3-768-rc-localize.htm, dated: Feb. 9, 2006.

"Software Distribution Guidelines", http://developer.apple.com/documentation/DeveloperTools/Conceptual/SoftwareDistribution4/Concepts/sd_guidelines.html, Jul. 24, 2006.

"User Interface Localization with the Compact Framework", http://www.codeproject.com/useritems/UILocalizationWithCF20.asp, dated Oct. 4, 2006.

* cited by examiner

MULTI-FORMAT CENTRALIZED DISTRIBUTION OF LOCALIZED RESOURCES FOR MULTIPLE PRODUCTS

BACKGROUND

Distribution of localized resources is currently performed as part of a build, preparation, and RTW (released to web) process for the various products and services. This process carries significant overhead for product, operations, and localization teams. Each product team builds localized resources as a part of the overall product build process. The resources are essentially built and distributed as an integrated part of the product. This means that every update requires the updated localized files to be built and propagated either as a full release or a QFE (quick fix engineering).

Under existing conditions, development teams need to build all international files during the development and localization product cycle in order to support the international versions of the product. The international builds need to be propagated to test beds and production, as needed. This adds weight and dependencies to the development process such that localization teams are completely dependent on the core build process for the deployment of localized resources to the test beds. This also adds overhead to the process especially given that, for the most part, the localization teams work in different time zones relative to the development and build teams. This means if there are issues, then teams can lose a significant amount of time waiting for resolution from the core team.

In a highly-competitive world of product development and distribution for online products and services, as the interdependencies between teams grow, there is a demand for fast and efficient approaches for updating and distributing the localized resources in a way that facilitates not only the individual products but the network as a whole.

SUMMARY

The following presents a simplified summary in order to provide a basic understanding of novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a multi-format centralized distribution framework that allows product teams to update and download resources independent of a product build process and, to store and distribute the resources from a central repository (a shared resource server system) in multiple formats. Resources include localized, non-localized, configuration settings, parameters, etc. The central repository includes a storage structure that can support all markets and all products. Resources can now be updated on the product frontend (e.g., a product web server) or delivered directly to the client when requested.

More specifically, the architecture includes a centralized resource deployment system for storing team resources in a single file format (e.g., RESX) and distributing the resource in multiple formats (e.g., XML, RESX, JS, etc.). Both server-side and client-side rendering are supported. The architecture provides a delivery mechanism for localized strings that supports client-side rendering (e.g., through JavaScript files) and server-side rendering (e.g., through providing XML and RESX files). In further support of the deployment of updated localized strings without requiring a build, the architecture supports the sub-versioning of strings. In support of scalability, different levels of caching of the strings through an edge cache and custom designed cache mechanism are provided.

Controlled delivery of resources is provided by allowing filtering of the resources (e.g., localized) to deliver a limited asset of resources, for example. Additionally, the grouping and combining of resources is facilitated to minimize the number and size of files delivered, which can be a performance advantage.

The single repository of content can serve multiple sites and products, which can be used for configuring market-specific behaviors such as providing strings and testing string values to enable or disable features.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
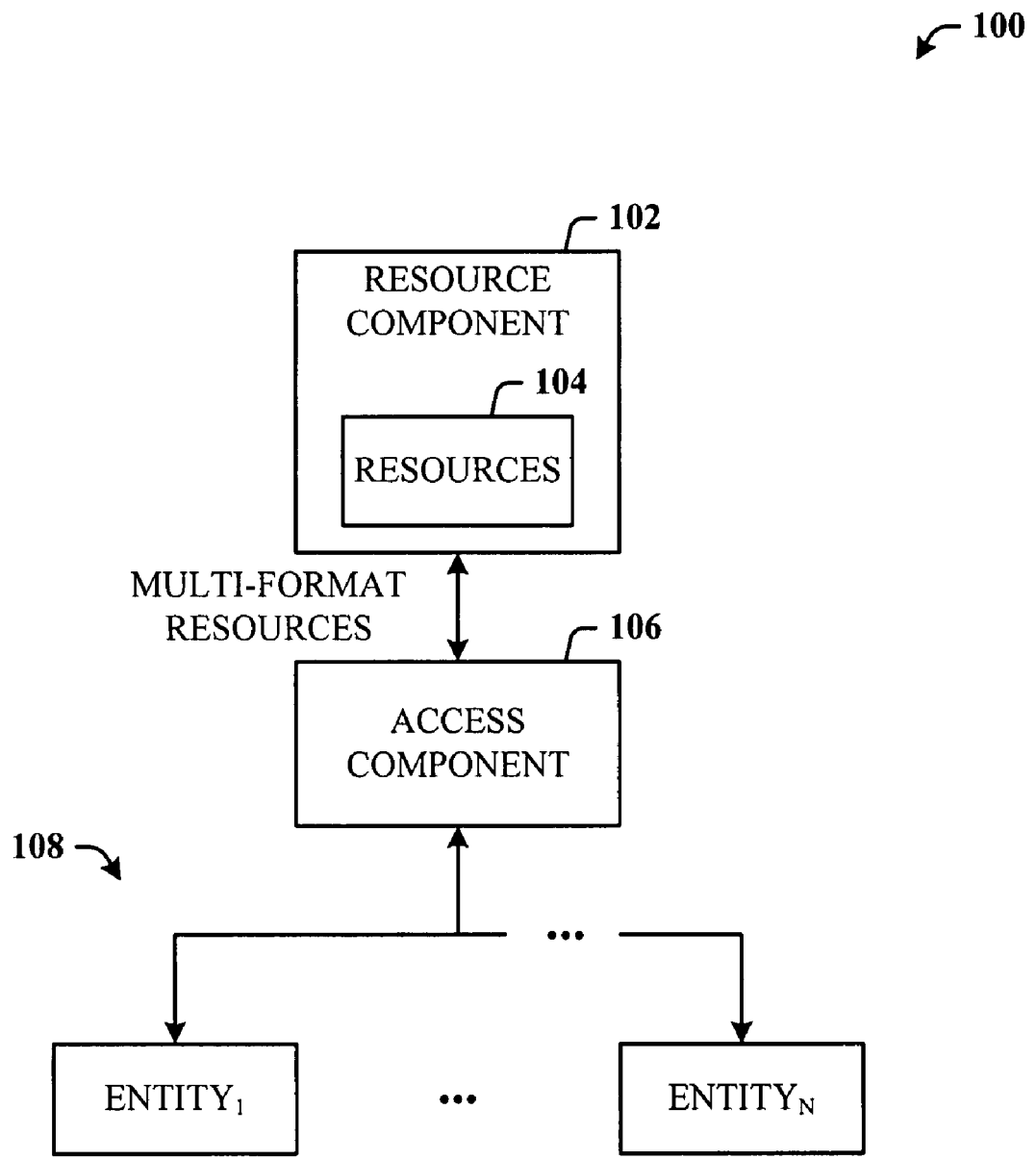
FIG. 1 illustrates a computer-implemented system that facilitates resource management.

The disclosed architecture is a multi-format distribution framework using a single repository and from which sets of resources (e.g., localized, non-localized, configuration settings, parameters, etc.) are served in various formats to consuming applications. The resources are runtime updatable enabling of both direct and indirect delivery of resources from a single repository of content. Delivery of the resources can be controlled by allowing filtering of the resources to deliver a limited asset of the resources. Grouping and combining resources is provided for minimizing the number of files delivered. Thus, multiple sites and products can be served by the single repository of content. This supports the configuring of market-specific behaviors by providing strings and testing string values for the enablement or disablement of features. In a general context, market is intended to include a combination of language and region/country. In the context of resources, market includes a combination of language file(s) (e.g., strings) and the marketized file(s) (e.g., marketized resources such as name, address, etc., formatting, URLs, list ordering, feature availability, and other market-specific configuration resources).

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented system 100 that facilitates resource management. The system 100 includes a centralized resource component 102 for storing resources 104 in multiple formats at the central location for different product build processes. An access component 106 facilitates allowing interaction with the resources 104 independent of the build processes in the form of updating and/or downloading. The resources 104 can be accessed for various purposes by one or more entities 108 (denoted by ENTITY$_1$, . . . , ENTITY$_N$, where N is a positive integer). For example, the entities 108 can be consumers (e.g., applications, customers) of the resources 104 that download the resources 104 in one or more different formats. The entities 108 can also include product teams that make updates offline, and then upload the updates to the resource component 102 for later distribution to consumers.

Figure 2:
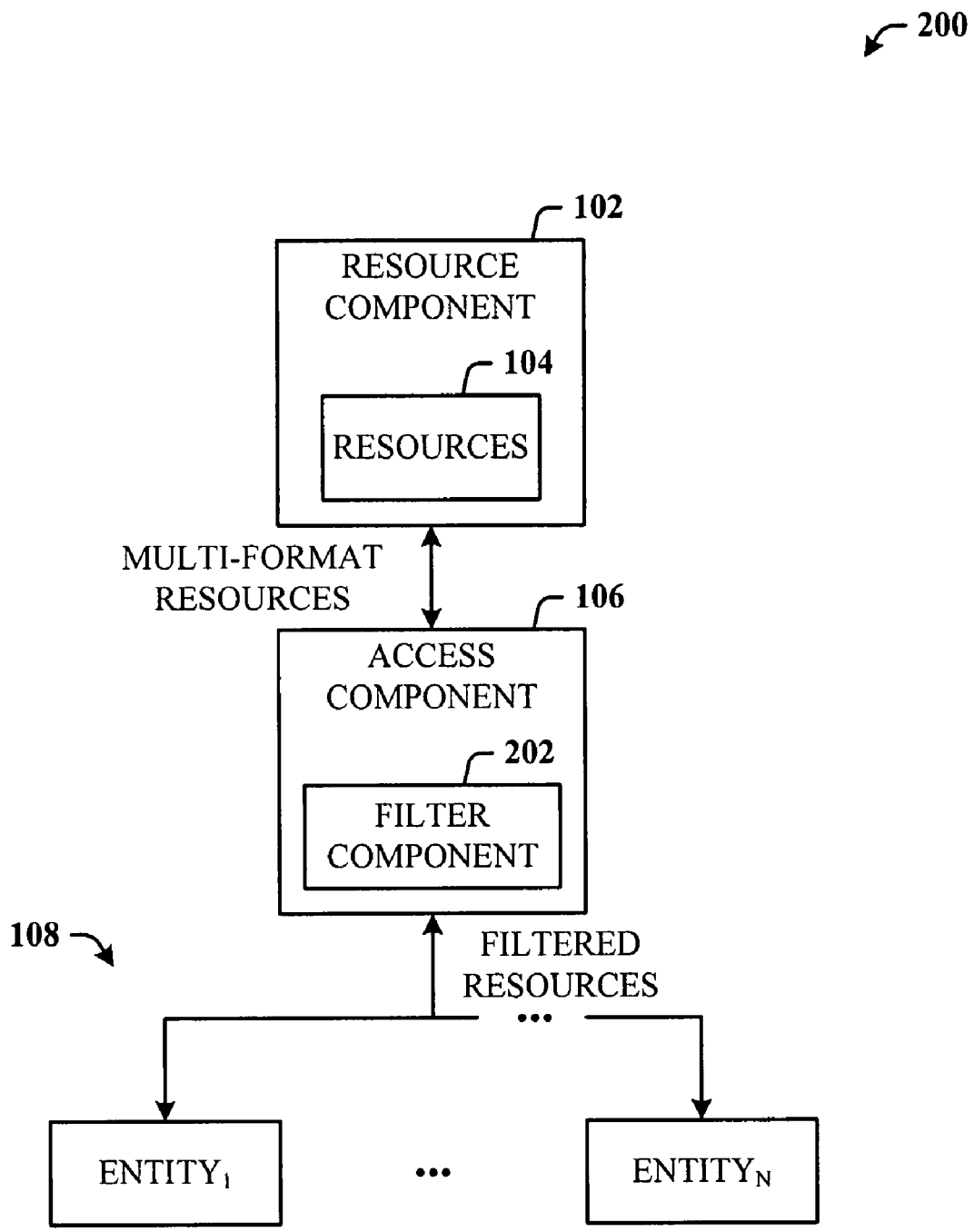
FIG. 2 illustrates a centralized multi-format resource distribution system that employs filtering as a means for interacting with stored resources.

FIG. 2 illustrates a centralized multi-format resource distribution system 200 that employs filtering as a means for interacting with stored resources. A filtering component 202 of the access component 106 facilitates the requesting of a selected amount or collection of the resources 104 rather than having to download a full distribution QFE (quick fix engineering) set of files. This allows for improved performance by grouping and combining the resources 104 to minimize the number of files delivered. Alternatively, the filtering component 202 can be hosted as part of the resource component 102.

Figure 3:
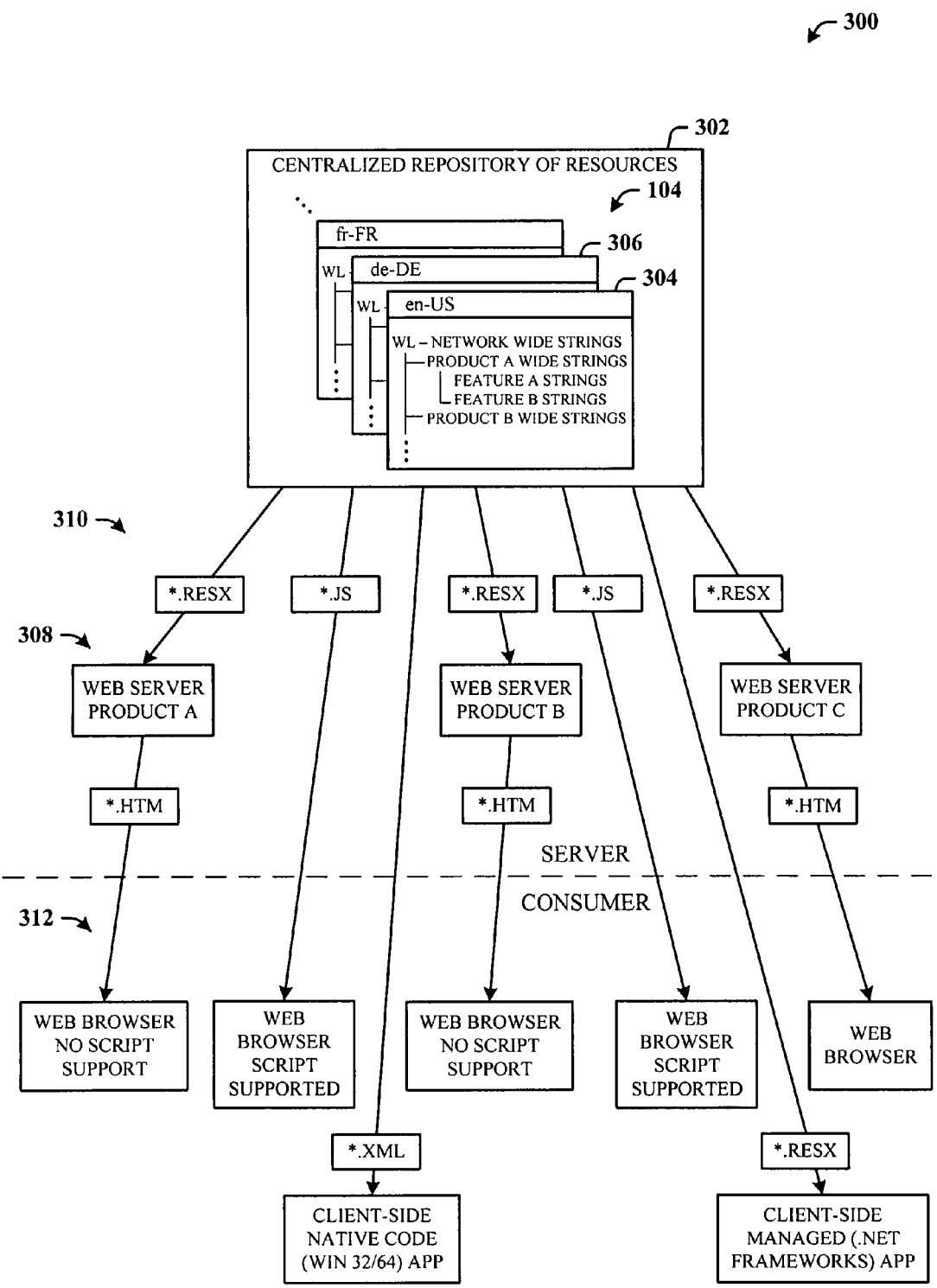
FIG. 3 illustrates a more detailed centralized multi-format resource distribution system in accordance with the novel architecture.

FIG. 3 illustrates a more detailed centralized multi-format resource distribution system 300 in accordance with the novel architecture. The system 300 is a centralized resource distribution system that includes providers that can handle different types of resources in a single format and deliver the same resource in multiple formats. The system 300 includes a centralized repository 302 (e.g., the resource component 102 of FIG. 1) on which the resources 104 are stored. The resources 104 (e.g., as a collection of different file formats or a collection of files in a single format) can be stored as per market folders. For example, a first folder 304 can include all files related to the US market, a second folder 306 can include all files related to the German market, and so on.

The system 300 facilitates the distribution of the same resources 104 in a number of different formats and depending on the product requirements. At least two types of resources can be distributed. Resources can be distributed as shared controls that reside on servers, and as local resources such as localized strings that can be cached on product frontend systems 308. The system also facilitates updating the stored resources 104 selectively or entirely according to market, language and/or locale.

FIG. 3 illustrates that the resources 104 can be distributed in at least three formats 310 from the repository 302: a *.resx format, XML format, and/or a *.js format. The resx format is a resource file format that can include XML (extensible markup language) entries that specify objects and strings inside XML tags. The js file format is for a JavaScript™ source code file. A provider (e.g., strings provider) is included which can handle strings in resx format and can deliver the strings in various formats such as JavaScript (.js), XML (.xml) and/or HTML depending on the format required by consumers 312 (e.g., products).

A consumer can be a web browser or a client-side application. Product web servers 308 are also referred to herein as frontend servers or frontends. The central repository 302 includes resources based on a combination of language and locale (region). The combination of language and locale is also known as the market, for example, English/Untied States. This also includes resources that are localized based on language only. Upon a customer's request for a resource, the system 300 tries to retrieve resources that are determined by requested market. However, if these resources are not found, a fallback mechanism is in place to find resources based on the language specified or to a default market if none of the former is found.

As illustrated, the consumers 312 can receive the resources 104 in the different formats 310 either directly or indirectly. For example, one of the consumers 312 can receive a resource indirectly through one of the frontend web server 308 for a Product A, initially as resx formatted resource to the frontend server, and from the frontend server to the consumer as an HTM file format for a web browser. Alternatively, one of the consumers 312 can receive a resource directly from the repository 302 as a js formatted resource. The indirect method can be used for consumers 312 that do not include scripting support. The direct method for js files can be employed for consumers 312 that include scripting support. The direct method also includes distributing resource files in an XML format to consumers 312 for installation as client-side native code applications (e.g., Win32 and/or Win64) and in the resx format to consumers 312 for installation as client-side managed code applications (e.g., .NET frameworks).

In other words, using this system 300, a web browser can request strings from the repository 302 and receive the result as a JavaScript code which should include the values of the strings as a JavaScript array. On the other hand, for a browser consumer that does not support JavaScript, the browser can request an HTML file (e.g., *.HTM) that is pre-rendered on one of the frontend servers 308 with the localized strings already included in the HTML.

Accordingly, it can be seen that using the centralized distribution model disclosed herein, that the localization team can access the file(s) from the central location and make updates without a product team being involved. As soon as the resources are updated in the repository the files become immediately available to the product or service consumers 312 and in the desired format of the consuming application. This entire process requires no intervention from the core development teams or operations teams.

In both the server-side and client-side rendering, the resources can be versioned in the central repository 302 using for example, a major number, a minor number, and/or a build number.

Figure 4A:
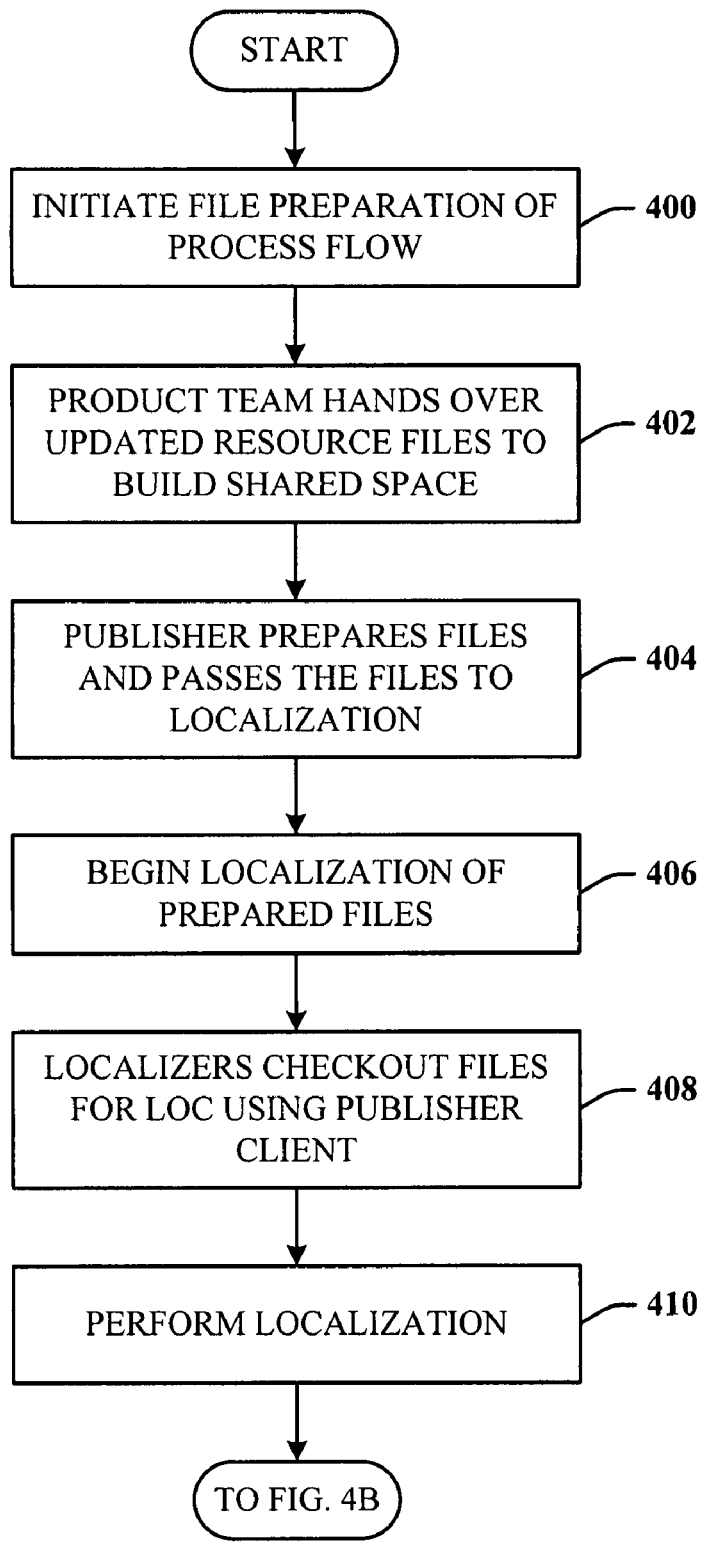
FIGS. 4A-4C illustrate one exemplary end-to-end process for file preparation and localization in accordance with the multi-format distribution architecture.
Figure 4B:
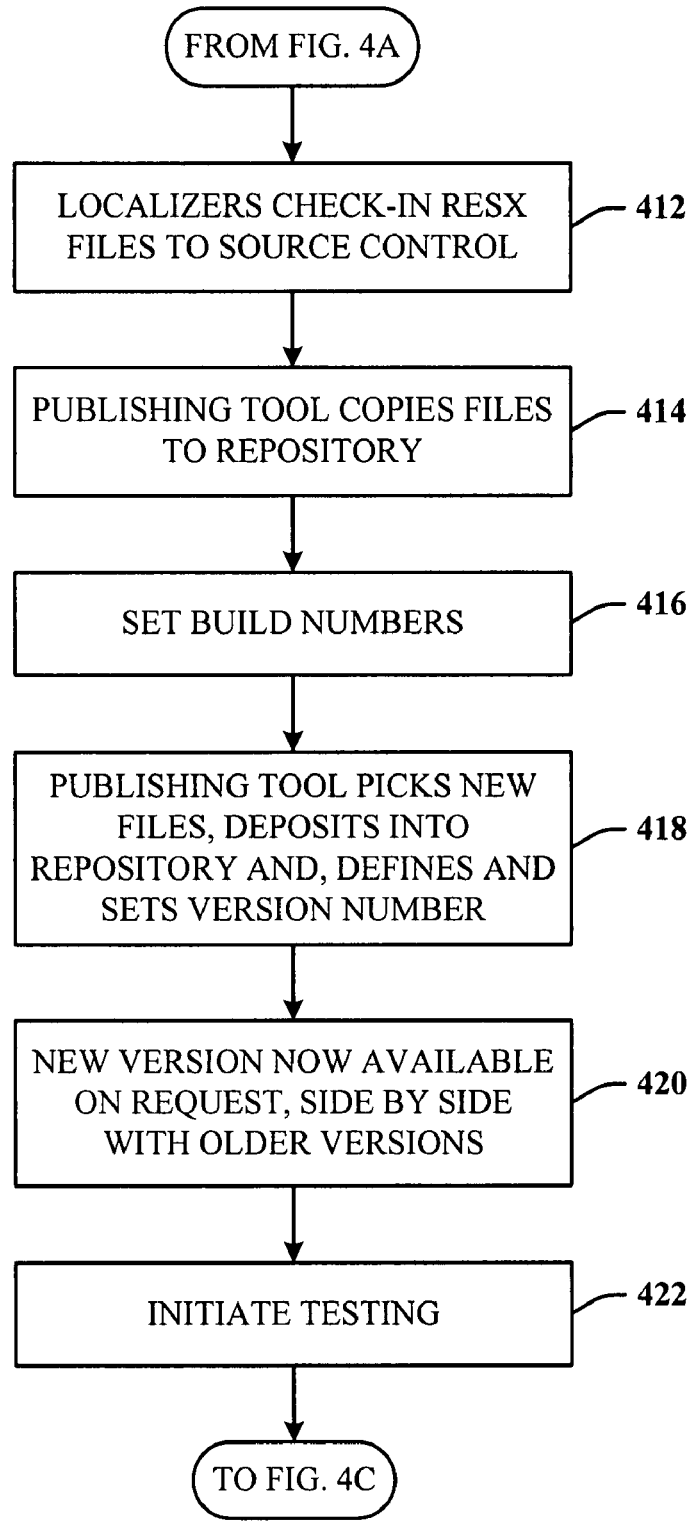
Figure 4C:
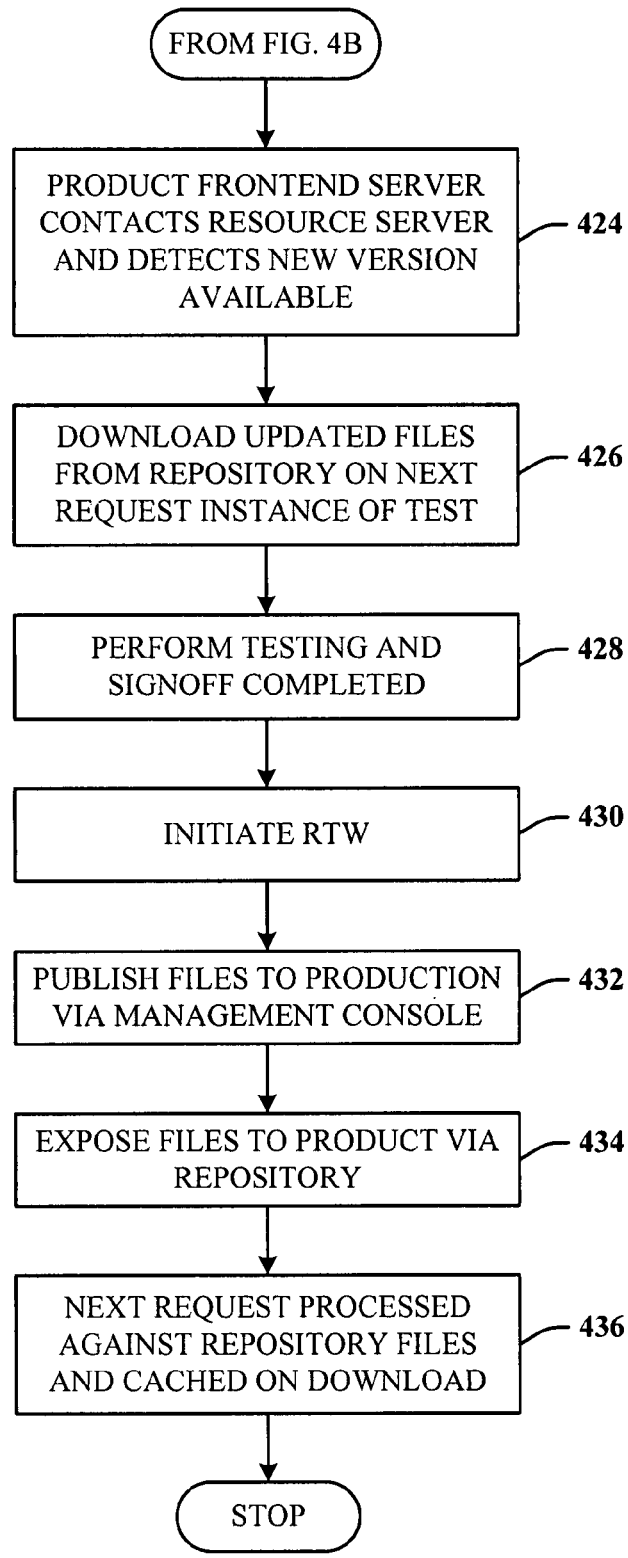

FIGS. 4A-4C illustrate one exemplary end-to-end process for file preparation and localization in accordance with the multi-format distribution architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Referring now to FIG. 4A, at 400, file preparation is initiated for process. At 402, a product team hands over updated resource files (e.g., *.resx) to shared space of a build team. At 404, a publisher is used to prepare the resource files and pass the files to a localization process. At 406, localization of the prepared files is initiated. At 408, localizers checkout the files for loc using a publisher client. At 410, localization is performed. Upon completion, the localizers hand back the files through the publisher. The hand-back process includes generating an resx file, checking the resx file into a strings folder, renaming the resx file from foo.resx to foo.xx-xx.resx (where xx-xx is language-region code), and building. When a build is run (e.g., automated), the resx files are copied to the build share.

Accordingly (moving to FIG. 4B), at 412, the localizers check-in resx files to source control. At 414, the publishing tool copies the files to the repository. At 416, build numbers are set. At 418, the publishing tool picks the new files, deposits the new files into the repository and, defines and sets a version number. At 420, the repository files are now available for testing, as well as older versions. At 422, testing of the files is initiated.

Moving to FIG. 4C, at 424, a product frontend server contacts the resource server and detects that a new version is available. At 426, the updated files are downloaded from the repository on the next instance of a request for test. At 428, testing is performed and completed. At 430, RTW (release to web) processing is initiated. At 432, the files are published to production via a management console. At 434, the files are exposed to the product team via the repository. At 436, the next request for the files is processed against the repository, and the downloaded files are cached on the frontend.

In one implementation, the act of publishing to production is a manual process that is run on demand. In another implementation, an interface and ACLs (access control lists) can be added to the publishing tool that allows core teams to publish to production independently.

Figure 5:
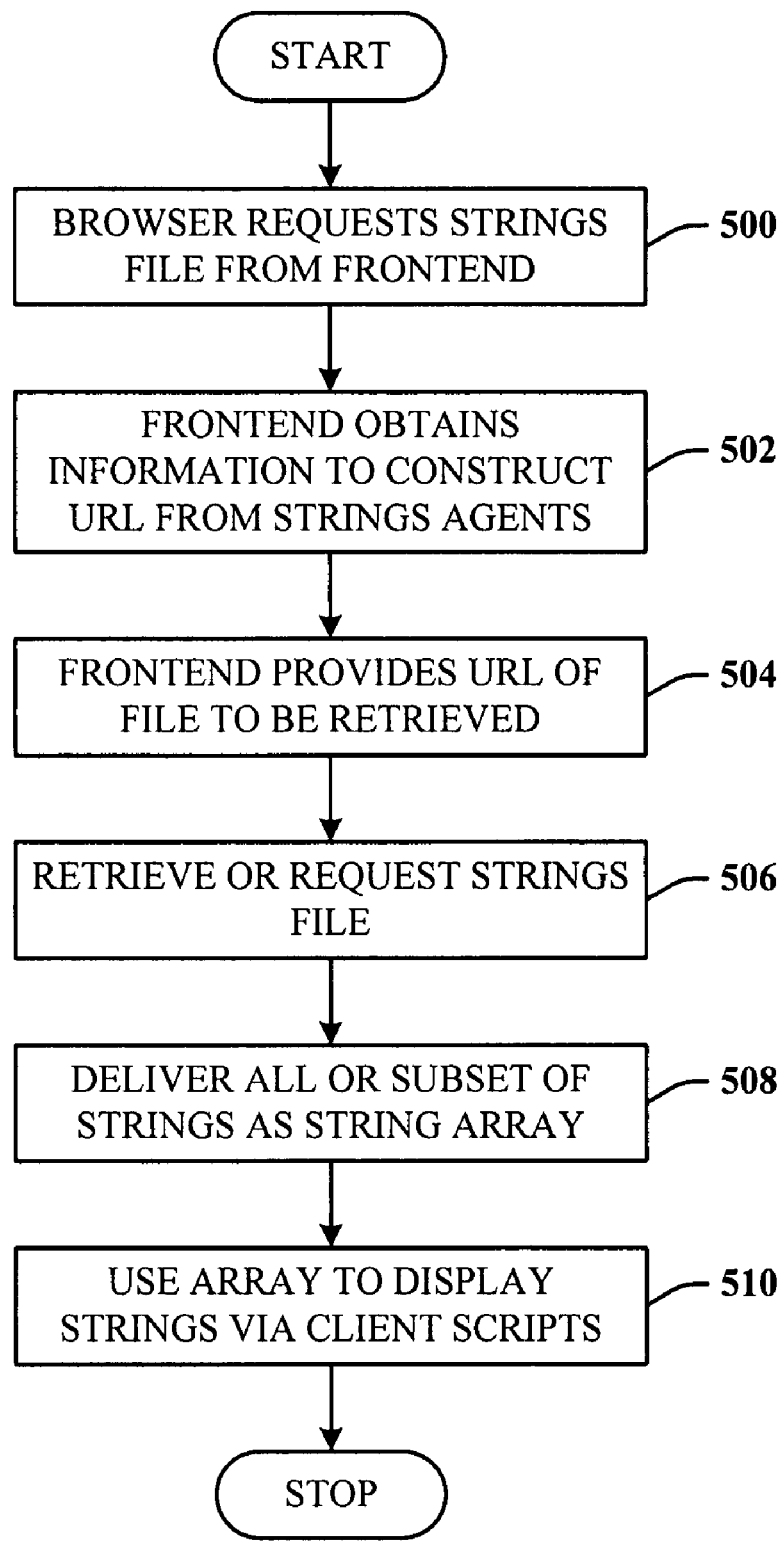
FIG. 5 illustrates a method of rendering strings on the client-side.

FIG. 5 illustrates a method of rendering strings on the client-side (or browser). At 500, a browser requests the strings js file from a frontend server. At 502, the frontend server obtains from a strings agent and/or a co-brand agent information to construct a URL (uniform resource locator) of the file. At 504, the frontend provides the URL of the file to be retrieved. At 506, the strings file is requested or retrieved. The file can then be retrieved from a cache, if available in the cache, or a request can be sent to a string provider on the repository side to generate the strings file. At 508, all or a subset of the strings can be delivered as a string array. At 510, the array can be used to display the strings via client scripts. Note that branding is a process of applying to or associating with the product elements such as recognizable marks or names (e.g., Microsoft™, Line Meeting™, etc.)

More specifically, the strings provider collects the required strings from the resx files available in the file store (e.g., the location of the resx files is provided to the strings provider and is based on the JavaScript filename) and applies a fallback process across markets and languages. The strings provider then contacts the co-brand control to retrieve a resx file of the available strings for the requested brand/market/version and updates strings values accordingly. This results in delivering a js file that includes all the strings (or part of the strings as requested by the client) as a JavaScript code (typically, an array of strings). This code can be used, in turn, in any of the client script to display strings as needed.

Figure 6:
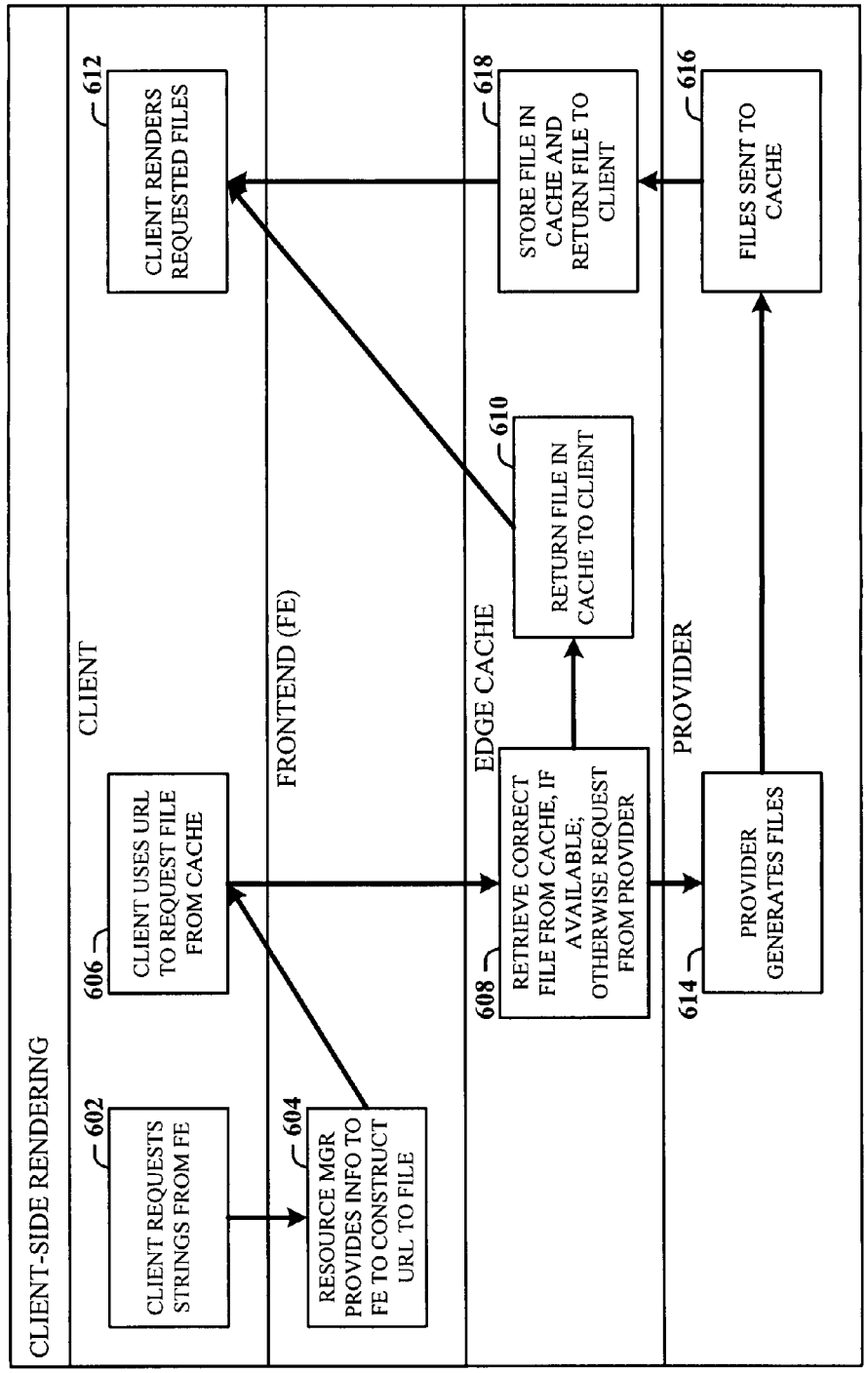
FIG. 6 illustrates an exemplary system of a client-side (or browser) rendering of strings using the centralized distribution architecture.

FIG. 6 illustrates an exemplary flow diagram 600 of a client-side (or browser) rendering of strings using the centralized distribution architecture. In the shown example, at 602, a client browser requests a strings file (e.g., JavaScript or js) from a frontend (FE) server (e.g., a web server for the associated product). At 604, a resource manager provides information to the frontend server to construct a URL to the file. The frontend the then passes the URL to the client. At 606, the client uses the URL to request a file from an edge cache. At 608 the file is retrieved from the edge cache, if the file is in the cache; otherwise, the file is requested from the provider. At 610, the cached file is returned to the client. At 612, the client renders the requested file. If the file was not cached, the file request is passed to the provider, where the provider generates the file(s), as indicated at 614. At 616, the generated file(s) are then sent from the provider to the cache. At 618, the cache stores the file and forwards the file to the client, where at 612, the client renders the file(s).

Client-side calls can be performed using a public API that facilitates using HTTP requests. A URL key can include parameters to help the repository in generating the resources. The parameters can include a string namespace, string subversion data, market information, co-brand ID, and co-brand version. The architecture can be configured to change the location of physical strings resources based on the string namespace or based on using special modes such as a developer/product mode.

Figure 7:
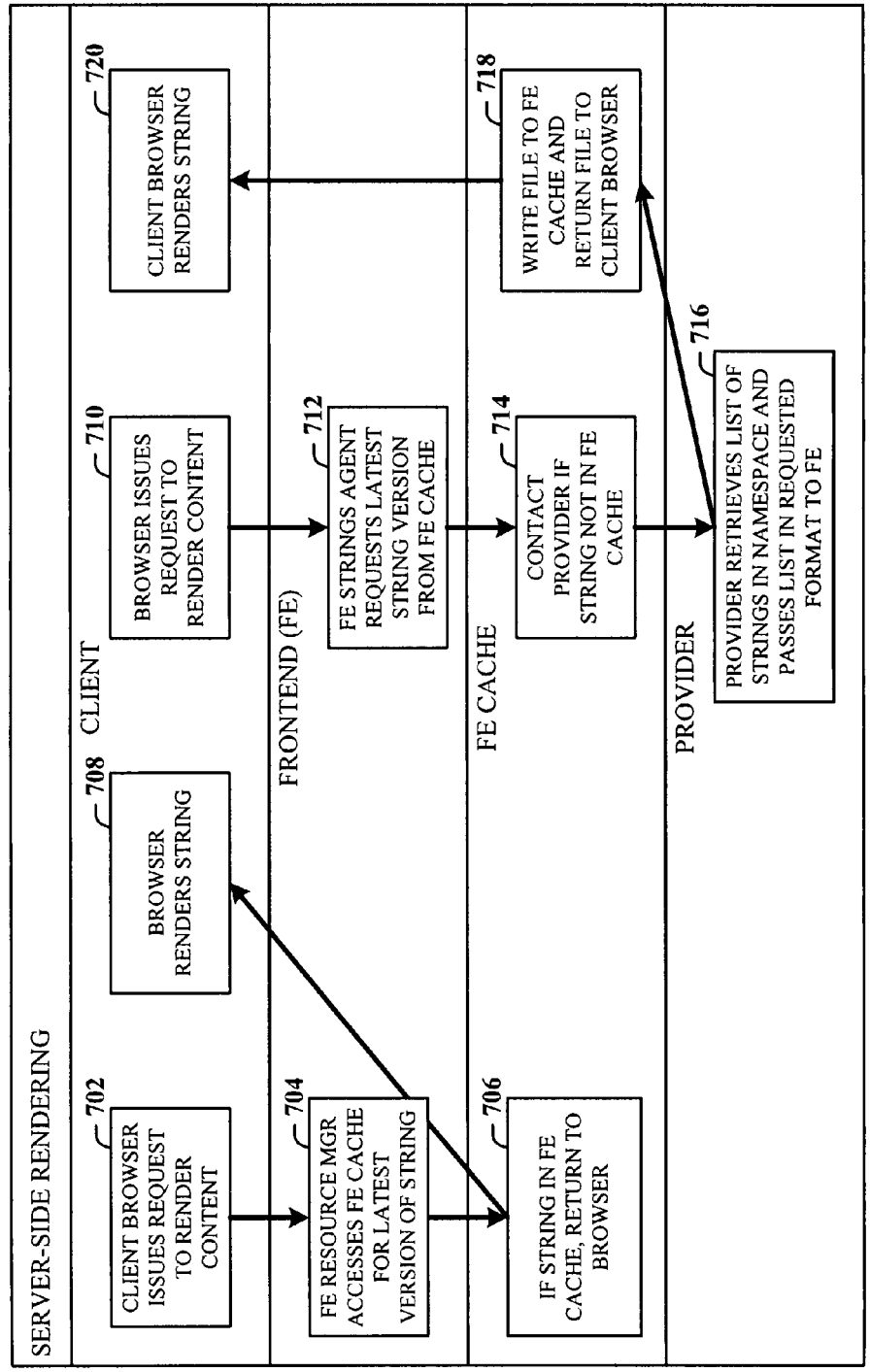
FIG. 7 illustrates an exemplary system of a server-side rendering of strings using the centralized distribution architecture.

FIG. 7 illustrates an exemplary flow diagram 700 of a server-side rendering of strings using the centralized distribution architecture. At 702, a client browser issues a request to render content. At 704, the client request is received at the frontend (FE), where a resource manager accesses a frontend cache for the latest version of the string. At 706, if the string is in the frontend cache, the string is returned to the client. At 708, the client then renders the string. Following is flow related to no string being in the cache. At 710, the client browser issues a request to render content. At 712, a frontend strings agent requests the latest string version from the frontend cache. At 714, if the string is not in the cache, the provider is contacted. At 716, the provider retrieves a list of strings in the namespace, and passes the list to the frontend in the requested format (e.g., XML). At 718, the file is written to the cache, and the file is also returned to the client browser. At 720, the client receives and renders the string. In this case, the strings are rendered in the server side which eliminates the need for the client's browser 602 to support JavaScript, for example.

Branding information is provided by an external process, the result of which is resx files. The resx files can be distributed to the frontend server the same way as other files, but through a different provider.

Figure 8:
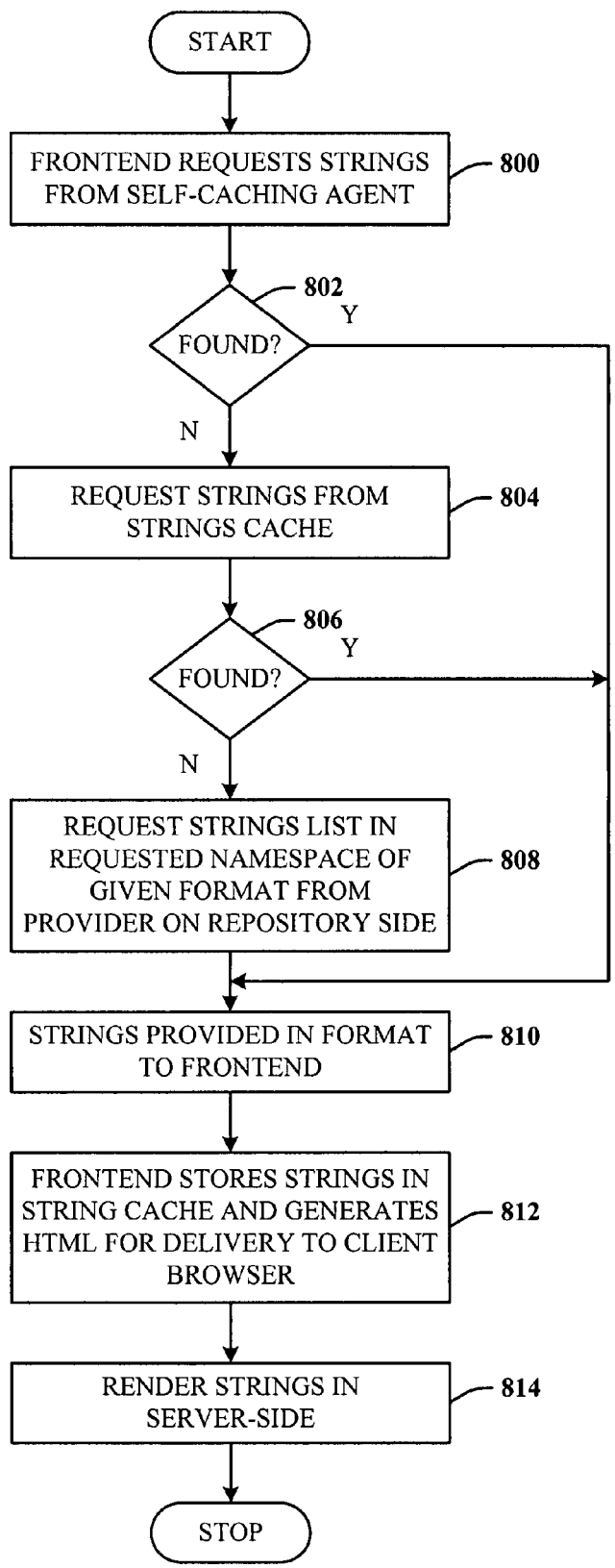
FIG. 8 illustrates a method of rendering strings on the server-side.

FIG. 8 illustrates a method of rendering strings on the server-side. At 800, a frontend server requests one or more strings via a self-caching agent. At 802, a check is made to determine if the one or more strings were found. If not, at 804, the strings are requested from a strings cache. If not found at 806, a string list is requested in the requested namespace of a given format from a provider on the repository side, as indicated at 808. At 810, the strings are provided in the format of the frontend. At 812, the frontend stores the stings in a strings cache and generates HTML for delivery to the client browser. At 814, the strings are then rendered n the server side.

Figure 9:
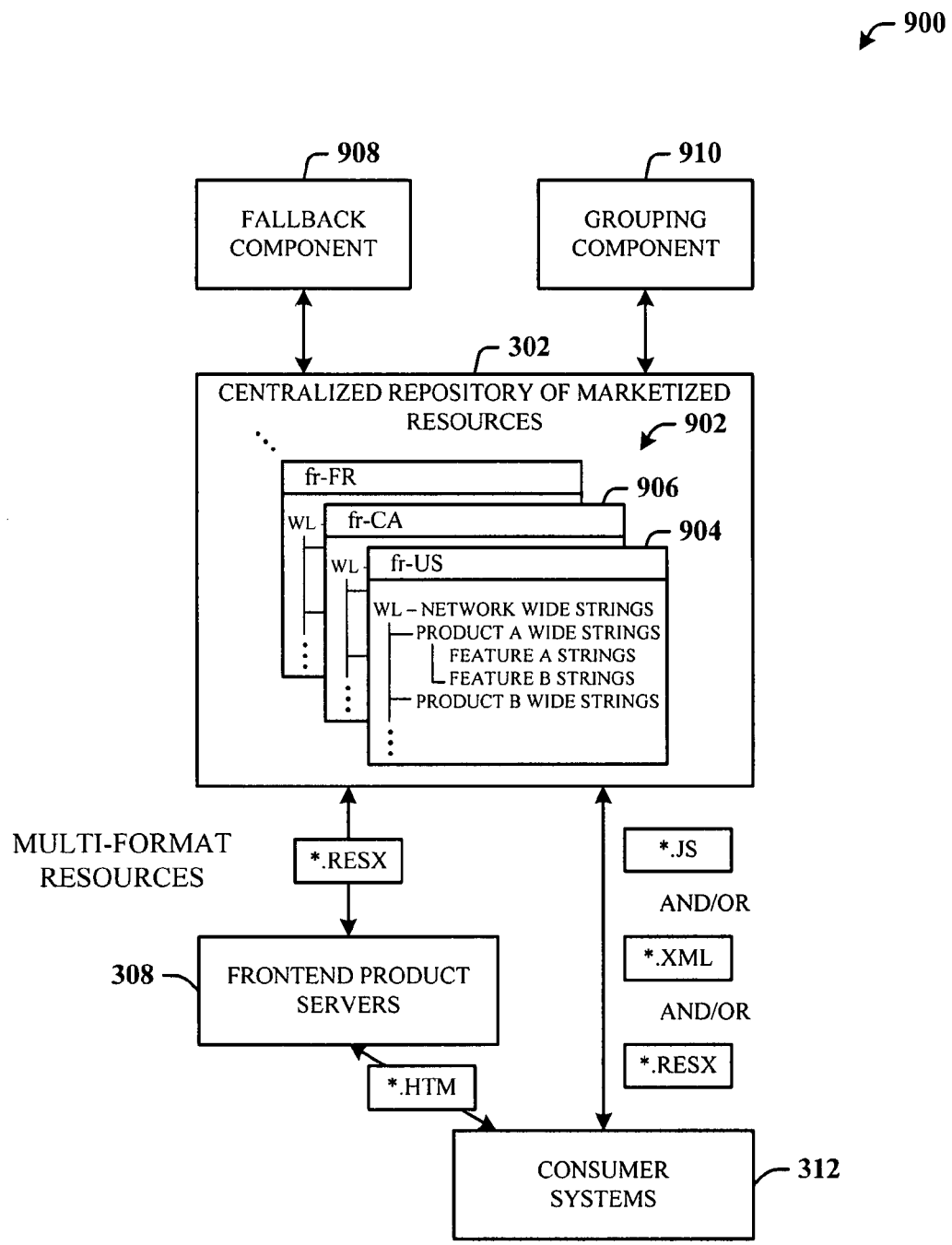
FIG. 9 illustrates a system of marketized resources.

FIG. 9 illustrates a system 900 of marketized resources 902. Here, rather than localized relative to geographic location, the resources can be grouped in the repository 302 according to market; for example, all markets that use French (fr) or variations thereof. The resources 902 are provided for at least French in the United States 904, French in Canada 906, and French in France. Based on these marketized resources, the resources can be served out in multiple formats. For example, the frontend product servers 308 can receive *.resx files and pass *.htm files to the consumer systems 312. Other types of the consumer systems 312 can receive the resources in any of the *.js, *.xml, and *.resx formats. These file format are only exemplary, in that, other file formats not described, can be employed. Note that resources can be tweaked to be retrieved using different contexts other than a market, such as build environment.

FIG. 9 also illustrates a fallback component 908. During localization, using the fallback component 908 eliminates the conventionally-required need to repeatedly define values. For example, if it is known that a value would exist only in the French market, the value does not need to be defined in the French Canadian market or along with the French Swiss market. The fallback logic that starts at the top level with a combination of the market and region, folds back to the language of concern, and then folds back to the invariant language which is currently being considered at length.

The system 900 can also include a grouping component 910 for combining multiple different files (e.g., *.resx) and/or partial files into one namespace. Thus, the option is provided to collectively retrieving some of the strings and subspace the number of strings that are repeating. The script can be utilized for the string namespace.

Figure 10:
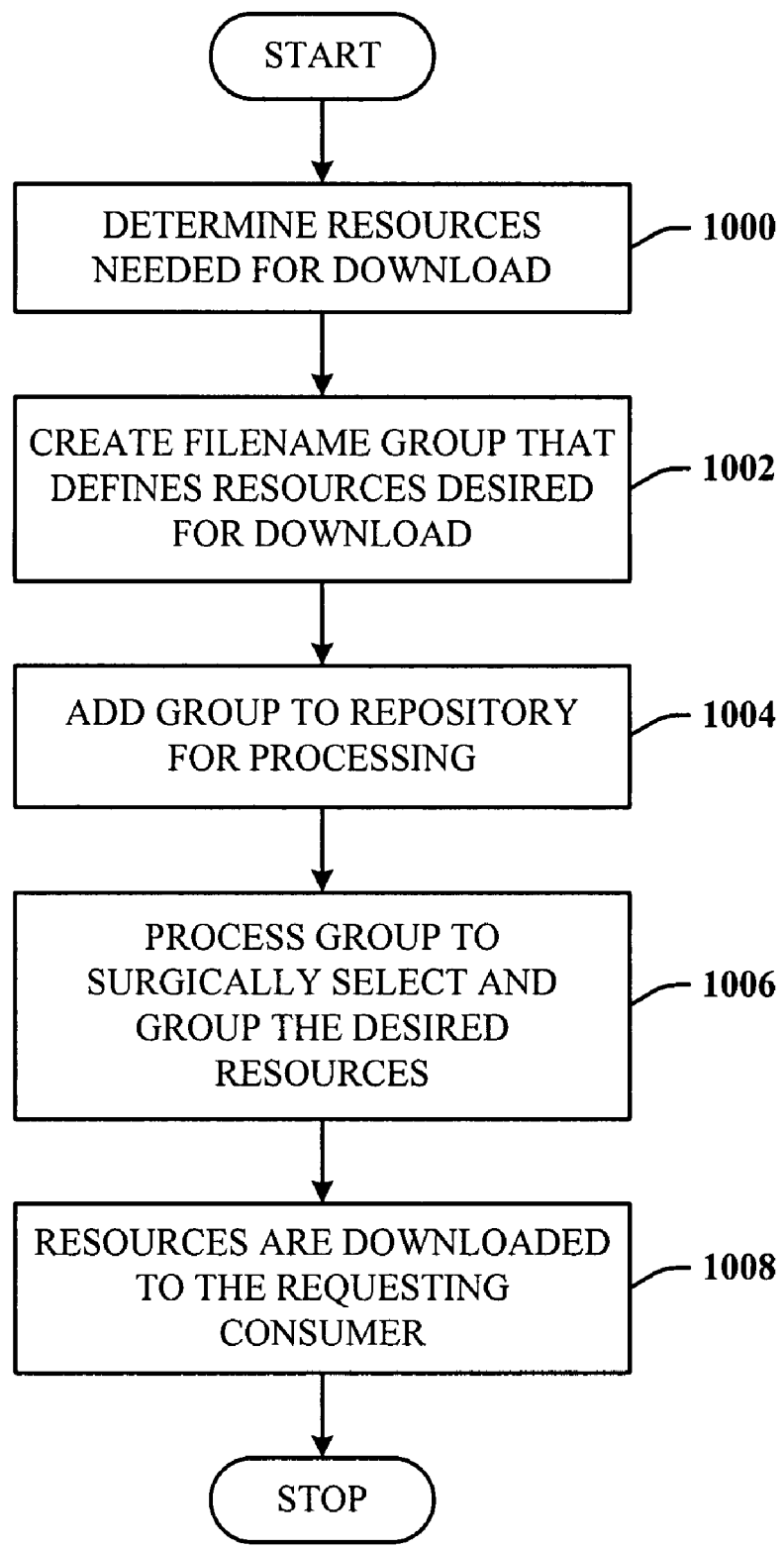
FIG. 10 illustrates a method of resource filtering.

FIG. 10 illustrates a method of resource filtering. At 1000, the resources needed for download is determined locally. At 1002, a filename group is created that defines resources on repository. At 1004, a group is added to the repository for processing. At 1006, the group is processed to surgically select for download the resources. At 1008, the defined resources are collected at the repository and downloaded to the requesting consumer.

As a general summary of some of the features, the disclosed framework integrates with a publishing tool, enables sub-versioning of the localization files, deploy resources for all controls, enables low cost, high impact resource updates to be carried out on-the-fly, provides improved efficiency for localization teams, supports marketized strings, allows deploying changes to strings without the need for build, centralized storage and managing of strings, multi-format delivery of the strings, support for server-side and client-side rendering, support for environment dependent strings, support for variable substitution to reduce the effort in localizing and maintaining shared strings, and transparent co-branding. Note that co-branding is replacing selected sources with third-party resources such as logo images, titles, and/or URLs, for example.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 11:
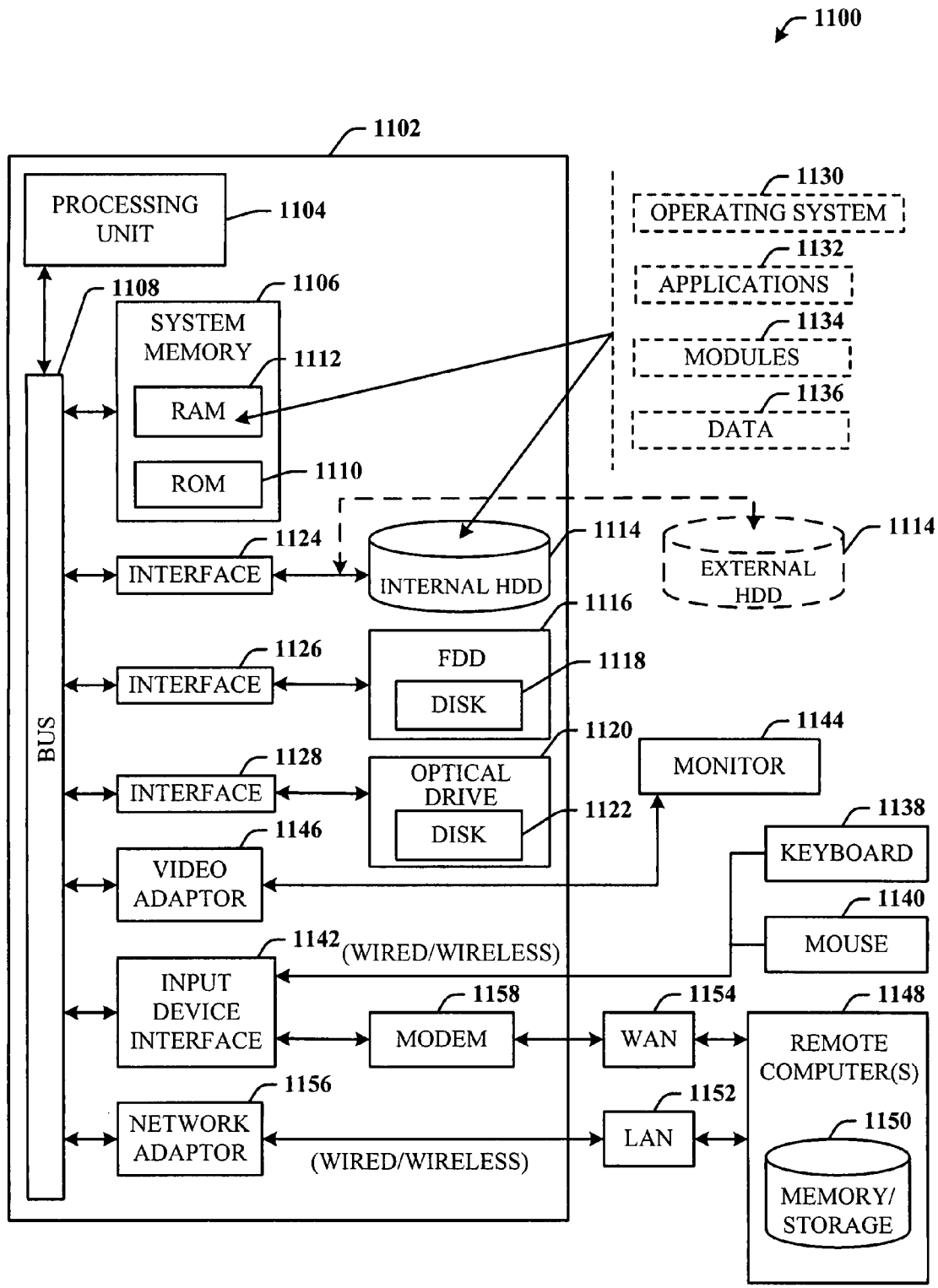
FIG. 11 illustrates a block diagram of a computing system operable to support the disclosed centralized multi-format distribution architecture.

Referring now to FIG. 11, there is illustrated a block diagram of a computing system 100 operable to support the disclosed centralized multi-format distribution architecture. In order to provide additional context for various aspects thereof, FIG. 11 and the following discussion are intended to provide a brief, general description of a suitable computing system 1100 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary computing system 1100 for implementing various aspects includes a computer 1102, the computer 1102 including a processing unit 1104, a system memory 1106 and a system bus 1108. The system bus 1108 provides an interface for system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1112, including an operating system 1130, one or more application programs 1132, other program modules 1134 and program data 1136. The one or more application programs 1132, other program modules 1134 and program data 1136 can include the resources 104, folders 304, and web browsers and client-side code 312, for example. This also can include the resource component 102, access component 106, filtering component 202, one or more of the blocks of FIGS. 6 and 7, fallback component 908 and grouping component 910. The system 1102 can be utilized in support of the repository 302, the frontend servers 308, and system for the consumers 312.

All or portions of the operating system, applications, modules, and/or data can also be cached in the RAM 1112. It is to be appreciated that the disclosed architecture can be implemented with various commercially available operating systems or combinations of operating systems.

A user can enter commands and information into the computer 1102 through one or more wired/wireless input devices, for example, a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 12:
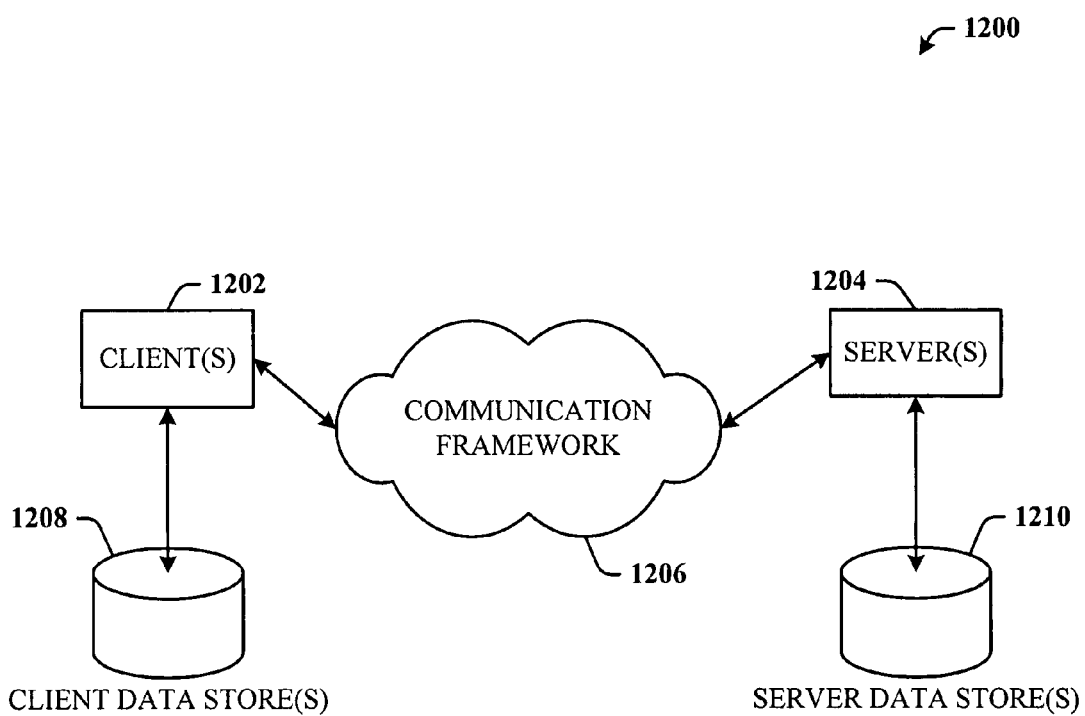
FIG. 12 illustrates a schematic block diagram of an exemplary computing environment that supports the disclosed centralized multi-format distribution architecture.

Referring now to FIG. 12, there is illustrated a schematic block diagram of an exemplary computing environment 1200 that supports the disclosed centralized multi-format distribution architecture. The system 1200 includes one or more client(s) 1202. The client(s) 1202 can be hardware and/or software (e.g., threads, processes, computing devices). The client(s) 1202 can house cookie(s) and/or associated contextual information, for example.

The system 1200 also includes one or more server(s) 1204. The server(s) 1204 can also be hardware and/or software (e.g., threads, processes, computing devices). The servers 1204 can house threads to perform transformations by employing the architecture, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204. The clients 1202 can include the consumers 312, and the servers can include the frontend 308 and the repository system 302, for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates resource management, comprising:
   a resource component for storing team resources in a single format and delivering the resources in multiple formats for supporting different product build processes;
   an access component for allowing interaction with the resources independent of the build processes, to enable the resources to be accessed for various purposes by at least one entity, the resources are runtime updatable to enable direct and indirect delivery of the resources;
   a filtering component for filtering the resources to deliver a limited asset of the resources, for grouping and combining the resources to reduce a number of files delivered; and
   a processor that executes computer-executable instructions associated with at least one of the resource component, the access component, or the filtering component.

2. The system of claim 1, wherein the interaction involves updating the stored resources.

3. The system of claim 1, wherein the interaction involves downloading the resources specific to a market.

4. The system of claim 3, wherein the resources are grouped at the resource component for downloading specific to the market.

5. The system of claim 1, wherein the resources are in the form of strings that are converted into the multiple formats for distribution to requesting consumers.

6. The system of claim 5, wherein the multiple formats include scripting and markup language file formats.

7. The system of claim 1, wherein the resources are distributed to a consumer via a frontend server.

8. The system of claim 1, wherein the resources are distributed directly to a script-supported consumer.

9. The system of claim 8, wherein the script-supported consumer receives the resources as a script file that includes all or a subset of the resources.

10. The system of claim 1, wherein the resources are rendered on one of a client or server.

11. A computer-implemented method of managing resources, comprising acts of:
    storing resources in a single format on a central repository for different build processes;
    requesting the resources according to a locale;
    formatting the resources into a selected one of multiple formats based on a consumer that issued the request;
    updating the resources at runtime for direct and indirect resource delivery;
    filtering the resources to deliver a limited asset of the resources, to reduce a number of files delivered;
    distributing the resources in the selected one of the multiple formats to the consumer independent of a build process; and
    utilizing a processor to execute instructions stored in memory to perform at least one of the acts of storing, requesting, formatting, filtering, or distributing.

12. The method of claim 11, further comprising distributing the resources from providers, one of which is a string provider.

13. The method of claim 11, further comprising rendering the resources in a browser of a client.

14. The method of claim 13, further comprising rendering the resources via the browser, the browser accessing a frontend web server to render the resources.

15. The method of claim 11, further comprising rendering the resources on a frontend server by checking a cache of the server.

16. The method of claim 11, further comprising initially attempting to find the resources by market and subsequently by language or a default market.

17. The method of claim 11, further comprising versioning the resources in the central repository according to at least one of a major version number, a minor version number or a build number.

18. The method of claim 11, further comprising grouping the resources and downloading the resources by a group.

19. A computer-implemented system, comprising:
    computer-implemented means for storing resources in a generic format in a single central repository;
    computer-implemented means for requesting the resources according to a market;
    computer-implemented means for formatting the resources into a selected one of multiple formats based on a requesting consumer;
    computer-implemented means for filtering the resources to deliver a limited asset of the resources, to reduce a number of files delivered;
    computer-implemented means for updating the resources at runtime for direct and indirect resource delivery;
    computer-implemented means for distributing the resources to the consumer in the selected one of the multiple formats independent of the build processes; and
    processor means that executes computer-executable instructions associated with at least one of the computer-implemented means for storing, requesting, formatting, filtering, or distributing.

* * * * *

UNITED STATES PATENT AND TRADEMARK OFFICE
CERTIFICATE OF CORRECTION

| | | |
|---|---|---|
| PATENT NO. | : 8,069,433 B2 | Page 1 of 1 |
| APPLICATION NO. | : 11/787942 | |
| DATED | : November 29, 2011 | |
| INVENTOR(S) | : Ryan D. Parsell et al. | |

It is certified that error appears in the above-identified patent and that said Letters Patent is hereby corrected as shown below:

IN THE SPECIFICATIONS:

In column 6, line 18, after "frontend" delete "the".

Signed and Sealed this

Seventeenth Day of January, 2012

David J. Kappos
*Director of the United States Patent and Trademark Office*